(12) United States Patent
Peng

(10) Patent No.: US 10,389,293 B2
(45) Date of Patent: Aug. 20, 2019

(54) METHOD FOR THE PROTECTION OF ELECTRIC MOTORS FROM CRITICAL OPERATING STATES

(71) Applicant: Kriwan Industrie-Elektronik GmbH, Forchtenberg (DE)

(72) Inventor: Xiaoming Peng, Öhring (DE)

(73) Assignee: KRIWAN INDUSTRIE-ELEKTRONIK GMBH, Forchtenberg (DE)

( * ) Notice: Subject to any disclaimer, the term of this patent is extended or adjusted under 35 U.S.C. 154(b) by 362 days.

(21) Appl. No.: 15/061,278

(22) Filed: Mar. 4, 2016

(65) Prior Publication Data

US 2016/0268952 A1    Sep. 15, 2016

(30) Foreign Application Priority Data

Mar. 9, 2015    (DE) .................... 10 2015 103 404

(51) Int. Cl.
| | |
|---|---|
| H02P 29/02 | (2016.01) |
| H02P 29/00 | (2016.01) |
| H02H 7/08  | (2006.01) |
| H02P 1/02  | (2006.01) |

(52) U.S. Cl.
CPC .......... *H02P 29/02* (2013.01); *H02H 7/0816* (2013.01); *H02P 1/02* (2013.01); *H02P 29/00* (2013.01)

(58) Field of Classification Search
CPC . H02P 29/02; H02P 1/02; H02P 29/00; H02H 7/0816

USPC ........................................ 318/432
See application file for complete search history.

(56) References Cited

U.S. PATENT DOCUMENTS

| | | | | |
|---|---|---|---|---|
| 5,877,604 A * | 3/1999 | Kessler | ................ | H02H 7/0833 318/434 |
| 6,501,629 B1 * | 12/2002 | Marriott | ................... | H02H 7/08 361/22 |
| 8,138,702 B2 * | 3/2012 | Nolemo | ................... | H02P 1/26 318/430 |
| 8,421,397 B2 * | 4/2013 | Yu | ........................ | H02P 29/032 318/779 |
| 8,466,643 B2 * | 6/2013 | Kishimoto | ............ | H02P 29/032 318/400.03 |
| 9,030,145 B2 * | 5/2015 | Brennenstuhl | ........ | H02P 29/028 173/1 |
| 9,525,366 B2 * | 12/2016 | Peng | ....................... | H02P 25/04 |

(Continued)

FOREIGN PATENT DOCUMENTS

| | | | |
|---|---|---|---|
| DE | 10 2009 012 942 A1 | 10/2010 | |
| DE | 102009012942 A1 * | 10/2010 | ........... F04D 23/008 |
| WO | 2008113308 A1 | 9/2008 | |

*Primary Examiner* — Jorge L Carrasquillo
*Assistant Examiner* — Devon A Joseph
(74) *Attorney, Agent, or Firm* — Renner Kenner Greive Bobak Taylor & Weber

(57) ABSTRACT

Method for the protection of electric motors from critical operating states wherein, as the electric motor is operating, a motor current value and/or a motor voltage value is/are measured and compared with a permissible operating range wherein an output signal is generated when leaving the permissible operating range and, while the electric motor is operating, the permissible operating range is determined and adjusted continuously from the measured motor current value and/or from the measured motor voltage value.

17 Claims, 7 Drawing Sheets

(56) References Cited

U.S. PATENT DOCUMENTS

| | | | | |
|---|---|---|---|---|
| 2005/0125199 A1* | 6/2005 | Slaight | ............... | G05B 23/0235 |
| | | | | 702/186 |
| 2010/0097731 A1* | 4/2010 | Franke | ................... | H02H 3/006 |
| | | | | 361/29 |
| 2010/0327790 A1* | 12/2010 | Nolemo | .................... | H02P 1/26 |
| | | | | 318/430 |
| 2012/0256580 A1* | 10/2012 | Yu | ......................... | H02P 29/032 |
| | | | | 318/779 |
| 2013/0046435 A1* | 2/2013 | Shin | ........................ | F02N 11/08 |
| | | | | 701/32.8 |
| 2013/0173135 A1* | 7/2013 | Kim | ......................... | F02C 7/26 |
| | | | | 701/100 |
| 2015/0155806 A1* | 6/2015 | Tsukamoto | ............. | F04B 49/06 |
| | | | | 318/400.11 |
| 2015/0180377 A1* | 6/2015 | Hua | ........................ | H02P 1/04 |
| | | | | 318/778 |
| 2017/0054396 A1* | 2/2017 | Sheahan | ................. | H02P 23/14 |

* cited by examiner

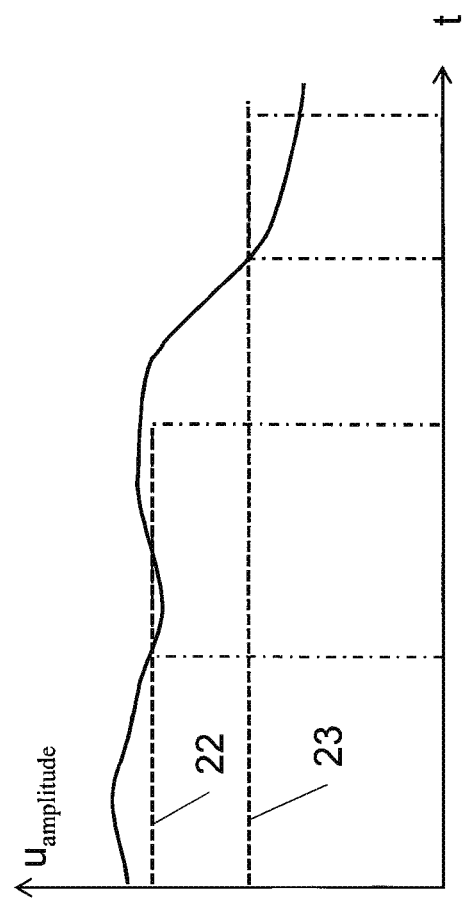

METHOD FOR THE PROTECTION OF ELECTRIC MOTORS FROM CRITICAL OPERATING STATES

TECHNICAL FIELD

The invention concerns a method for the protection of electronic motors from critical operating states wherein, as the electric motor is operating, a motor current value and/or a motor voltage value is/are measured and compared with a permissible operating range wherein an output signal is generated when leaving the permissible operating range.

BACKGROUND OF THE INVENTION

A method of controlling an electric motor is described in DE 10 2004 036 134 A1 in which a thermal overload of the armature winding is avoided by means of a current regulator. In this, a motor current actual value is measured and compared with a motor set point current value wherein, in the event of a difference, the motor actual current value is adjusted to the motor set point current value. In this case, the motor set point current value is calculated as a function of the motor's ambient temperature. Besides measuring the motor actual current value, this known method also requires the motor's ambient temperature to be recorded. Furthermore, the placing of the temperature sensor and establishment of a good contact are especially important in recording the motor's ambient temperature. Also, it is necessary to establish individually the relationship between the motor set point current value and motor's ambient temperature for different motors.

SUMMARY OF INVENTION

The invention is based on the task of specifying a method for the protection of electric motors from critical operating states which can be achieved cost effectively and can be used on widely differing electric motors.

According to the invention, this task is resolved by the features of claim 1 wherein, as the electric motor is operating, a motor current value and/or a motor voltage value is/are measured and compared with a permissible operating range wherein an output signal is generated when leaving the permissible operating range. Here, the permissible operating range is determined from the measured motor current value and/or the measured motor voltage value and continuously adjusted as the electric motor is operating.

Further embodiments of the invention form the subject matter of the other claims.

The method according to the invention is characterised in that the operating parameter to be monitored and which is being measured is also used to determine the permissible operating range at the same time. In this case, the motor current value and/or the motor voltage value are operating parameters which, in many cases, have been established already anyway, or can be recorded without great expense. Thus it is possible in particular to dispense with the often critical and costly positioning of a temperature sensor.

Operating an electric motor is characterised by an initial start-up operation (dynamic starting process) followed by normal operation. Both operating phases differ from each other relatively and therefore also require appropriately adjusted permissible operating ranges. Depending on whether one or both operating phases are to be monitored, the permissible operating range for the start-up operation and/or the normal operation have/has to be determined. It has proved to be advantageous in determining the permissible operating range of the start-up region if a start-up value and a threshold value of the measured motor current value and/or of the measured motor voltage value is/are determined wherein the threshold value signifies the transition to normal operation.

According to another embodiment, the determination of the permissible operating range for the start-up region also comprises recording the transition course of the measured motor current value and/or of the measured motor voltage value between start-up value and threshold value wherein starting a motor is not critical in the start-up region if the amplitude (absolute value) of the derivative of the recorded transition course does not exceed a predetermined maximum value. It follows that the transition course of the measured motor current value and/or of the measured motor voltage value between start-up value and threshold value should represent a differentiable transition course and not take on a stepwise shape.

The threshold value is appropriately defined by multiplying the start-up value by a predetermined factor (for example, 0.5). The threshold value, which has to be set after a predetermined time, in the case of a motor current measurement constitutes the upper limit for an uncritical motor start, and in the case of a motor voltage measurement constitutes the lower limit for an uncritical motor start.

According to another embodiment of the invention, the start-up value is defined by a first amplitude or first effective value of the measured motor current value and/or of the measured motor voltage value after one of the times listed below:
- a predetermined time after switching on the motor or
- a time at which the measured motor current value and/or the measured motor voltage value starts to assume the frequency of a mains supply on which the motor is operating, or
- a time after which the course of the measured motor current value and/or of the measured motor voltage value is/are differentiable.

Alternatively the start-up value can also be defined, however, by the maximum value of the measured motor current value after switching on the motor. In order to establish a critical, or uncritical, state of the motor in the start-up operation, it is not a question, therefore, of the actual amplitude of the start-up value, but depends more on whether the threshold value is reached in a predetermined time and, optionally, whether the amplitude (absolute value) the gradient of the transition course between start-up value and threshold value does not exceed a predetermined maximum value.

If the electric motor is in the form of an alternating current motor with a main winding and an auxiliary winding, the voltage value can be measured at the auxiliary winding and the start-up value can be established by the minimum value of the measured voltage value after switching on the motor.

According to a preferred embodiment of the invention, the determination of the permissible operating range for normal operation is carried out by establishing a comparative value obtained by averaging several values of the measured motor current value and/or of the measured motor voltage value during normal operation. Here, the determination of the comparative value be carried out, in particular, by low pass filtering of the measured motor current value and/or of the measured motor voltage value during normal operation. An upper and/or lower limit of the permissible operating range for normal operation can then be established by multiplying the comparative value by a predetermined factor (for example, 1.5 and/or 0.8).

In this case, the comparative value can be adjusted continuously. The adjustment takes place in such a manner that averaging, or low pass filtering, of the measured motor current value and/or of the measured motor voltage value takes place at the same time as the actual measured values are taken. The comparative value calculated by the moving averaging, or low pass filtering, of the measured motor current value and/or of the measured motor voltage value ensures that the operating states at any given time are adjusted automatically during normal operation. The moving averaging, or low pass filtering, is undertaken preferably with a predetermined time delay. By doing so, the permissible operating range can be prevented from being adjusted too soon by a measurement value that is rising or falling too rapidly and, thereby, moving the upper limit or, respectively lower limit, of the permissible operating range beyond an acceptable value. Provision can be made for other safety measures such as suspending the continuous adjustment of the comparative value if the measured motor current value and/or the measured motor voltage value leave(s) the permissible operating range momentarily. In this case, the adjustment of the comparative value is not resumed until after a time delay when the measured motor current value and/or the measured motor voltage value again fall(s) within the permissible operating range.

As a further alternative method of determining the upper and/or lower limit of the permissible operating range for normal operation, multiplication of the start-up value by a predetermined factor can be used. This criterion enables the upper and/or lower limit of the permissible operating range for normal operation to be established simply and reliably if continuous adjustment to changing operating states is not necessary. Thus, the upper limit 12 in the case of a motor current measurement of, for example, 0.8 of the start-up value 5 and the lower limit 23 in the case of a motor voltage measurement of, for example, 1.1 of the start-up value 20 can be determined. Provision can be made both in the start-up operation as well as in normal operation that the output signal when leaving the permissible operating range is not generated until the measured motor current value and/or the measured motor voltage value leaves the permissible operating range for at least a defined time, wherein the defined time can be a predetermined time or can be a function of the extent by which the permissible operating range is exceeded. By doing so, short spikes or erroneous measurement of the measured motor current value can be prevented from switching off the motor accidentally.

A predetermined time of 2 seconds, for example, can be regarded as a critical operating state. If the measured motor current value and/or the measured motor voltage value is/are outside the permissible operating range to an above average extent, provision can still be made that the defined time can be reduced to one second, for example.

BRIEF DESCRIPTION OF THE DRAWINGS

The invention is now explained in more detail using the description of two examples of embodiments and by the drawing.

The drawings show

DETAILED DESCRIPTION OF THE ILLUSTRATIVE EMBODIMENTS

Figure 1:
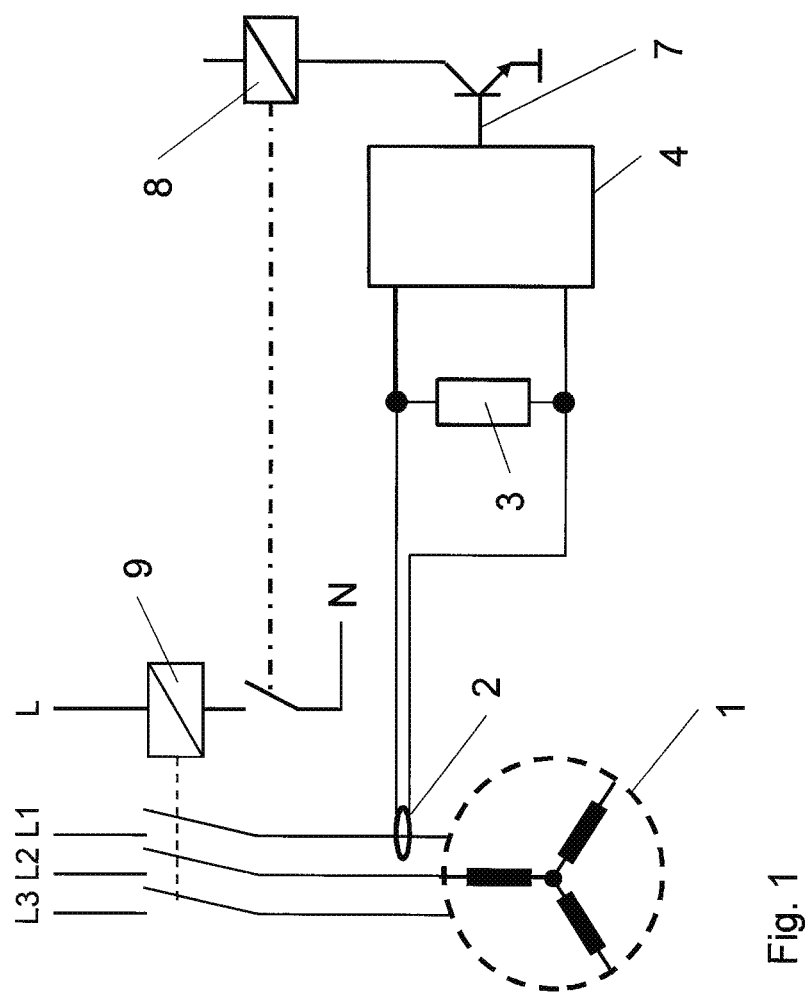
FIG. 1 a circuit diagram of a three phase motor with monitoring of the motor current, FIG. 2 a characteristic curve of the motor current amplitude during the start-up operation, FIG. 3 an alternating current characteristic curve of the motor current during the start-up operation, FIG. 4 a characteristic curve of the motor current amplitude during normal operation, FIG. 5 a circuit diagram of an alternating current motor with monitoring of the voltage in the motor's auxiliary winding, FIG. 6 a characteristic curve of the voltage amplitude of the motor's auxiliary winding during the start-up operation and FIG. 7 a characteristic curve of the voltage amplitude of the motor's auxiliary winding in normal operation.
Figure 2:
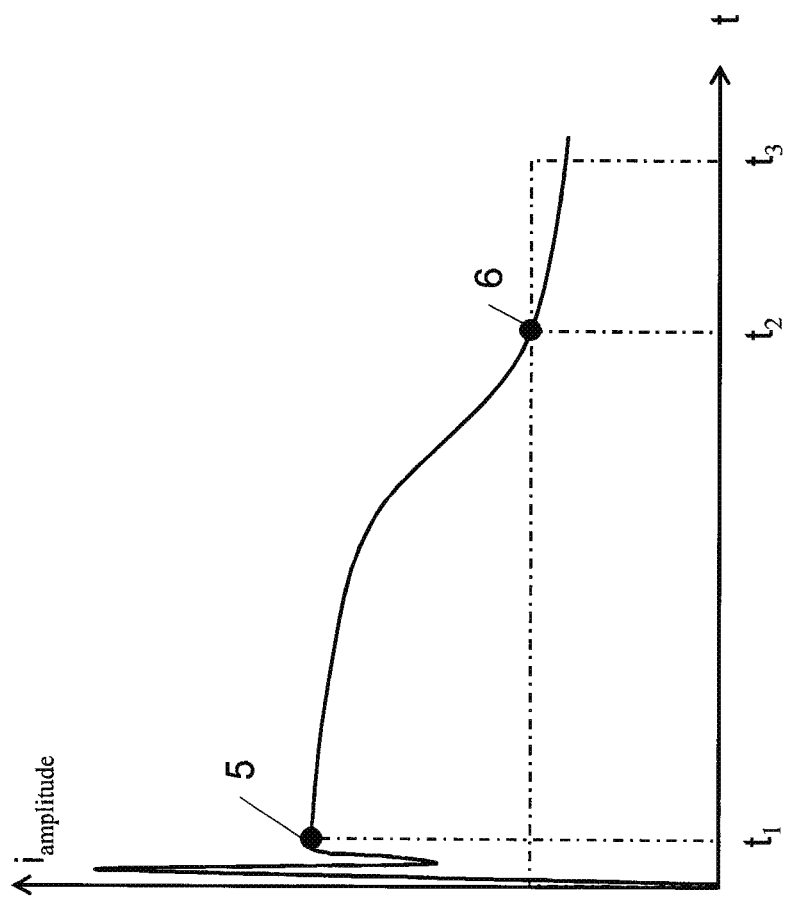

FIG. 1 shows a circuit diagram with a three phase motor 1 in which the motor current is tapped into by a current transformer 2 in one phase and transformed into a motor current value by a measuring resistor 3 in a microprocessor 4. The determination of the motor current value is done continuously in predetermined, short time intervals of, for example, 1 ms. This typically produces a characteristic curve for the start-up region of the three phase motor 1, as shown in FIG. 2. After a short first phase in which the motor's current amplitude fluctuates widely, a start-up value 5 is set, defined, for example, by the current amplitude at a predetermined time $t_1$ after switching on the motor. After time $t_1$ a constantly falling transition course is set to a threshold value 6, wherein the threshold value 6 again represents a current amplitude which, for example, is established by multiplying (the current amplitude of) the start-up value 5 by a predetermined factor (for example, 0.5). The dynamic course of the motor's current amplitude shown in FIG. 2 then represents a successful start-up process of the three phase motor 1 if the current amplitude falls under the determined threshold value 6 up to the latest time $t_3$ after switching on the three phase motor. The latest time $t_3$ can be, for example, 5 seconds after starting the motor. In the illustrated example, the threshold value is reached already at time $t_2$.

As a further criterion for starting a motor successfully, the transition pattern of the current amplitude between the start-up value 5 and the threshold value 6 can be examined also. Here, it is assumed that a motor is started successfully if the amplitude (absolute value) of the derivative of the recorded transition pattern does not exceed a predetermined maximum gradient value of, for example, 1000 A/s. It is possible in this manner to detect, in particular, an abrupt change in pattern reflecting a magnetically-induced excessive start-up current, circuit bouncing, or an erroneous measurement. An abrupt change in course can cause the threshold value 6 to be exceeded but this by no means rules out a successful motor start-up. This additional criterion eliminates fault detection of the type which would miss a possible critical motor start-up.

If no successful motor start-up has been detected by the latest time $t_3$, this constitutes a critical motor start-up. In the event of a critical motor start-up, the microprocessor 4 would generate an output signal 7, causing the three phase motor to be shut down in a suitable manner, for example, by means of relays 8, 9.

Figure 3:
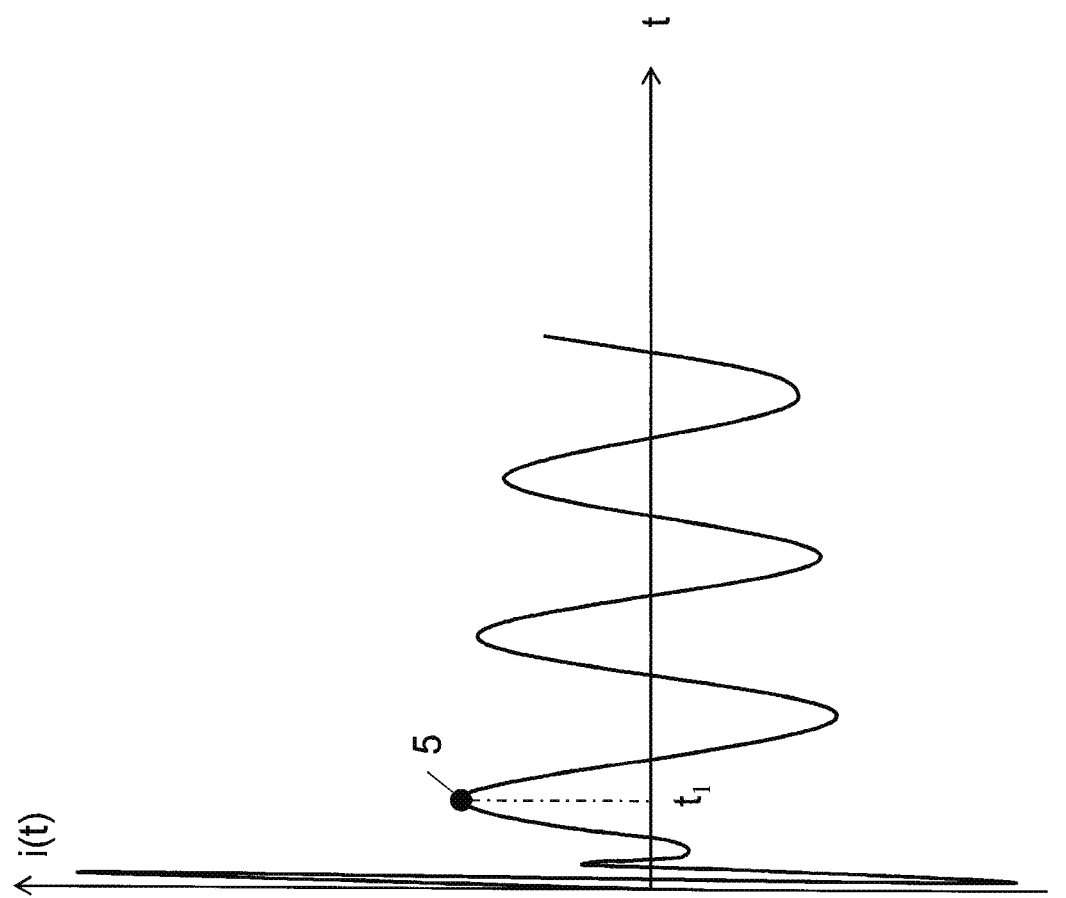

As an alternative to establishing the start-up value 5, the time $t'_1$ can also be used which signifies that the measured motor current value has started to assume the frequency of the of the mains supply on which the motor is being operated (see FIG. 3). Before time $t'_1$, the current spike is significantly higher and the current value has a significantly faster course. Again, establishing the threshold value 6 can then be done by multiplying by a predetermined factor as in FIG. 2. There is another possible way of determining the start-up value 5 by examining the obtained characteristic curve to find the time after which the characteristic curve is differentiable. "Differentiable" in this context is meant to be a transition process which does not exceed a predetermined maximum gradient. This time would coincide with the time $t_1$ in the characteristic curve in FIG. 2. Another conceivable variant in determining the start-up value would be to determine the maximum value of the measured motor current after switching on the motor. In all cases, however, using the determined start-up value, a threshold value is calculated which must not be exceeded within a predetermined time $t_3$ when a motor current is being measured.

The motor current curve illustrated in FIG. 2 is typical for an electric motor and differs essentially in the size of the current amplitude only. In all cases, the current characteristic curve is characterised in that a start-up value 5 is set after initial wide fluctuations, after which there is a differentiable transition to a threshold value. Thus, it is not necessary to adjust the protection switching process (microprocessor 4) for different motors since the limits that have to be observed are themselves established from the measurement of the operating parameter being monitored.

Figure 4:
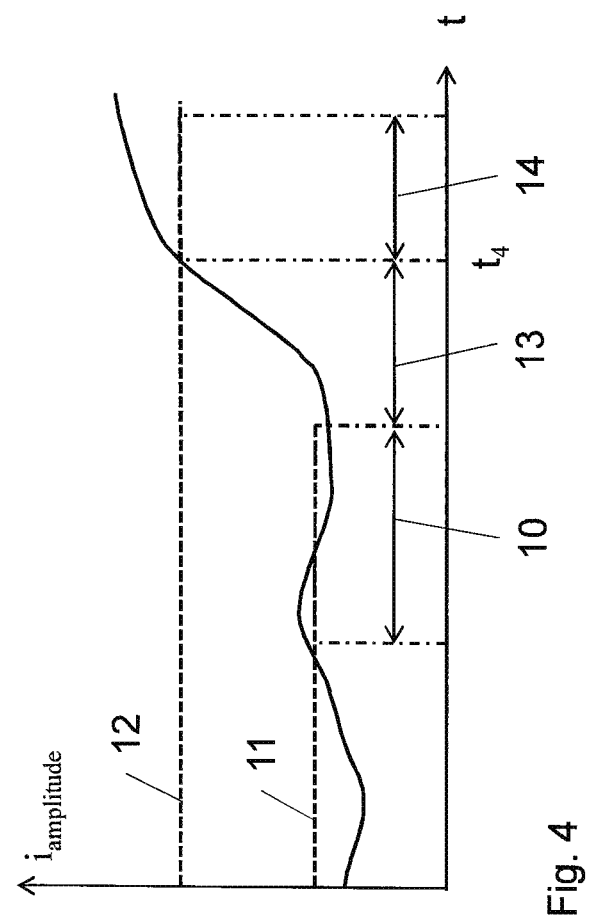

The normal operating region whose motor current characteristic curve is illustrated in FIG. 4 joins up with the dynamic start-up region illustrated in FIG. 2. Normal operation is characterised in uncritical operation by a slightly fluctuation in the course of the current amplitude. The fluctuations in the current amplitude in normal operation are caused in particular by the instantaneous load. However, the temperature of the motor and/or the environment can also have an effect. Thus, it is not unusual for the current amplitude to change when operating over longer periods without causing a critical operating state. Therefore, it is necessary to continuously adjust the permissible operating range in order to be able to monitor the normal operation reliably. According to the invention, the permissible operating range is determined by averaging the operating parameter values (here: motor current values) measured at a predetermined time interval 10. A comparative value 11 is produced from this averaged value. A critical state of the electric motor occurs when the motor current is being monitored, in particular, when the current amplitude exceeds an upper limit 12. This upper limit 12 has to be established again by multiplying the comparative value by a predetermined factor (for example, 1.5). It can be seen that the upper limit 12 of the motor current value is exceeded in FIG. 4 at time $t_4$. This indicates that the motor is in a critical state so that an appropriate output signal, for example, switching off the motor, should be triggered. In order to avoid unnecessarily switching off the motor when the upper limit 12 is exceeded momentarily, it is expedient if the output signal to switch off the motor is only generated if the motor current amplitude remains outside the permissible range for more than a predetermined time 14. In order to prevent determination of the comparative value 11 being distorted by measurement values determined shortly before leaving the permissible operating range, provision is also made that the adjustment of the comparative value is undertaken only after a time delay wherein adjustment is not done if the measured operating parameters leave the permissible operating range during the delay time.

In the embodiment illustrated in FIG. 4, the values measured in time interval 10 were used to adjust the comparative value 11, because the operating parameter still lies in the permissible operating range in the following time interval 13 which represents the delay time. However, the value measured in time interval 13 which is not used to adjust the comparative value 11 appears to be different because, in the following time interval 14, the operating parameter lies outside the permissible operating range.

Figure 5:
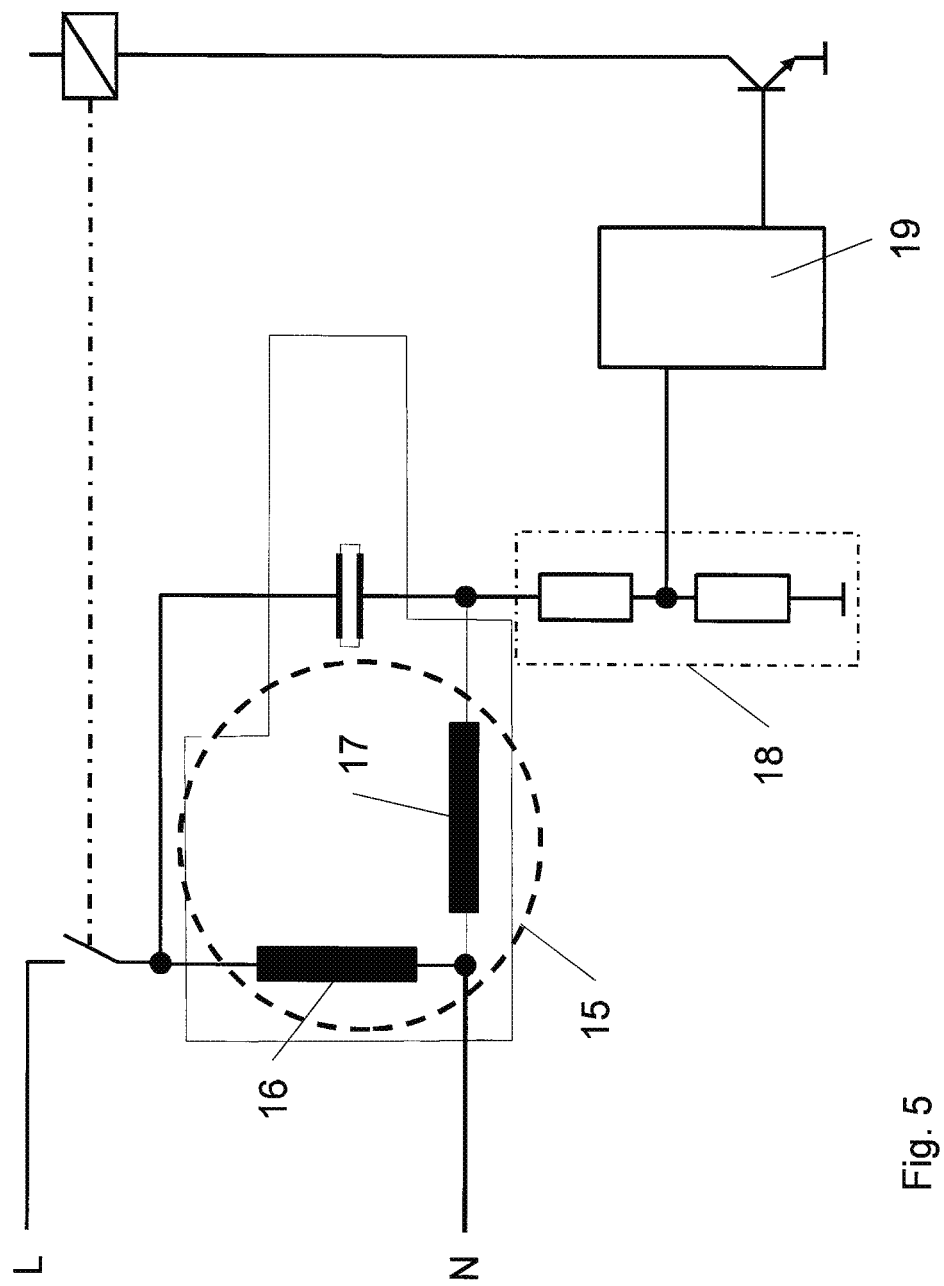
Figure 6:
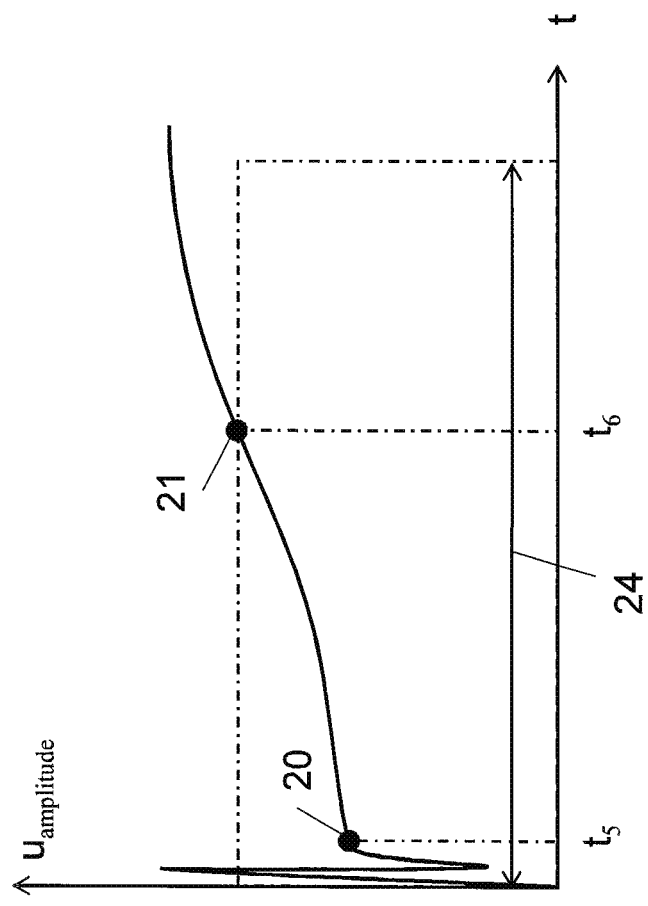

A second embodiment is illustrated in FIG. 5 and shows an alternating current motor 15 with a main winding 16 and an auxiliary winding 17, wherein the voltage of the auxiliary winding 17 is measured as an operating parameter by a measuring circuit 18 with the aid of a microprocessor 19. The determined characteristic curve of the measured voltage amplitude during the start-up region is illustrated in FIG. 6, while the voltage characteristic curve in normal operation is shown in FIG. 7.

Also, the voltage course during the start-up operation still fluctuates widely up to time $t_5$, during which it is climbing continuously. Again, it is possible to determine that the motor start-up is successful from threshold value 21, wherein the threshold value 21 is established again by multiplying a start-up value 20 by a predetermined factor (for example, 1.4) and is set at time $t_6$ in the illustrated example. In this case, start-up value 20 can be established in the same way by establishing the start-up value 5 when the motor current is measured. However, since the voltage amplitude in contrast to the motor current climbs steadily from the start-up value 20 to the threshold value 21, the threshold value 21 thus forms a lower limit for the voltage value to be achieved after a predetermined time interval 24. Otherwise, it is also possible in this case to examine the transition course between start-up value 20 and threshold value 21 to see if the course is differentiable.

In normal operation as in FIG. 7, again a comparative value 22 is calculated by averaging the measured voltage values to produce a lower limit 23 using a predetermined factor. The lower limit 23 can be produced, for example, by multiplying the comparative value by the factor 0.8. If the voltage falls below the lower limit 23, it is no longer in the additional operating range, leading, if necessary, to the triggering of an output signal after a delay time. Otherwise, when taking the voltage measurement, again the comparative value 22 is only adjusted after a predetermined delay time, wherein adjustment of the comparative value 22 in particular is not then carried out if the measured voltage may leave the permissible operating range during the delay time.

Although it is entirely sufficient if either the motor current or the motor voltage is monitored, it is conceivable within the scope of the invention also that both values are taken into account either separately from each other or are taken into account jointly as a performance monitor. The special aspect of the above method consists in the feature whereby establishing the permissible operating range is done by the operating parameter (current and/or voltage) being monitored. Therefore, the monitoring needs no target characteristic values specific to motors. Furthermore, the permissible operating range is determined and adjusted continuously during operation.

The method described above can be used, therefore, for different electric motors also.

The invention claimed is:

1. Method for the protection of electric motors from critical operating states wherein, as the electric motor is operating, a motor current value and/or a motor voltage value is/are measured and compared with a permissible operating range wherein an output signal is generated when leaving the permissible operating range, wherein the permissible operating range is determined from the motor current value and/or the motor voltage value;

wherein the motor current value and/or the motor voltage value is/are being measured while the electric motor is operating;

wherein the determination of the permissible operating range includes calculating an upper and/or lower limit of the permissible operating range and continuously adjusting the upper and/or lower limit of the permissible operating range while the electric motor is operating;

wherein the operation of the electric motor is characterised by an initial start-up operation followed by a normal operation, and the method includes determining the permissible operating range for the start-up operation and/or the normal operation;

wherein the determination of the permissible operating range for the start-up operation comprises the determination of a start-up value and of a threshold value of the measured motor current value and/or of the measured motor voltage value, wherein the threshold value signifies the transition to normal operation;

wherein the determination of the permissible operating range for the start-up operation also comprises recording a transition course of the measured motor current value and/or of the measured motor voltage value between start-up value and threshold value wherein a permissible operating range exists only if the amplitude of the derivative of the recorded course pattern does not exceed a predetermined maximum gradient.

2. Method according to claim 1, characterised in that the output signal when leaving the permissible operating range is not generated until the measured motor current value and/or the measured motor voltage value leaves the permissible operating range for at least a defined time, wherein the defined time constitutes a predetermined time or is adjusted as a function of the extent to which the permissible operating range is exceeded.

3. Method according to claim 1, characterised in that an upper and/or lower limit of the permissible operating range for the start-up operation is/are defined by the threshold value, produced by multiplying the start-up value by a predetermined factor.

4. Method according to claim 1, characterised in that the start-up value is defined by a first amplitude or a first effective value of the measured motor current value and/or of the measured motor voltage value after one of the times listed below:
   a predetermined time after switching on the motor or
   a time at which the measured motor current value and/or the measured motor voltage value starts to assume the frequency of a mains supply on which the motor is operating, or
   a time after which the course of the measured motor current value and/or of the measured motor voltage value is/are differentiable.

5. Method according to claim 1, characterised in that the start-up value is defined by the maximum value of a measured motor current value after switching on the motor.

6. Method according to claim 1, characterised in that the threshold value of the start-up operation is established by multiplying the start-up value by a predetermined factor.

7. Method according to claim 1, characterised in that an alternating current motor with a main winding and an auxiliary winding is used as an electric motor, wherein the motor voltage value is measured at the auxiliary winding and the start-up value is established by a minimum value of the measured motor voltage value after switching on the motor.

8. Method according to claim 1, characterised in that an upper and/or lower limit of the permissible operating range is/are established for normal operation by multiplying the start-up value by a predetermined factor.

9. Method according to claim 1, characterised in that the determination of the permissible operating range for normal operation consists of establishing a comparative value by averaging several values of the measured motor current value and/or of the measured motor voltage value during normal operation.

10. Method according to claim 9, characterised in that an upper and/or lower limit of the permissible operating range for normal operation is/are established by multiplying the comparative value by a predetermined factor.

11. Method according to claim 9, characterised in that the comparative value is adjusted continuously, but the adjustment is undertaken only after a predetermined time delay.

12. Method according to claim 11, characterised in that the continuous adjustment of the comparative value takes place in such a manner that the averaging or low pass filtering of the measured motor current value and/or of the measured motor voltage value takes place at the same time as the actual measured values are taken.

13. Method according to claim 9, characterised in that the comparative value is adjusted continuously, wherein, however, adjustment is suspended if the measured motor current value and/or the measured motor voltage value have/has left the permissible operating range and the adjustment is resumed with a time delay when the measured motor current value and/or the measured motor voltage value again fall(s) within the permissible operating range.

14. Method according to claim 13, characterised in that the continuous adjustment of the comparative value takes place in such a manner that the averaging or low pass filtering of the measured motor current value and/or of the measured motor voltage value takes place at the same time as the actual measured values are taken.

15. Method according to claim 9, characterised in that the continuous adjustment of the comparative value takes place in such a manner that the averaging or low pass filtering of the measured motor current value and/or of the measured motor voltage value takes place at the same time as the actual measured values are taken.

16. Method according to claim 1, characterised in that the determination of the permissible operating range for the normal operation consists of establishing a comparative value by low pass filtering of the measured motor current value and/or of the measured motor voltage value during normal operation.

17. Method according to claim 16, characterised in that the continuous adjustment of the comparative value takes place in such a manner that the averaging or low pass filtering of the measured motor current value and/or of the measured motor voltage value takes place at the same time as the actual measured values are taken.

* * * * *